US012036685B2

(12) United States Patent
Darwinkel et al.

(10) Patent No.: US 12,036,685 B2
(45) Date of Patent: Jul. 16, 2024

(54) HAIR-CUTTING UNIT FOR USE IN A HAIR-CUTTING APPLIANCE

(71) Applicant: KONINKLIJKE PHILIPS N.V., Eindhoven (NL)

(72) Inventors: Geert-Jan Darwinkel, Winsum (NL); Marcus Cornelis Petrelli, Groningen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 17/779,176

(22) PCT Filed: Dec. 3, 2020

(86) PCT No.: PCT/EP2020/084368

§ 371 (c)(1), (2) Date: May 24, 2022

(87) PCT Pub. No.: WO2021/115898

PCT Pub. Date: Jun. 17, 2021

(65) Prior Publication Data

US 2022/0402152 A1 Dec. 22, 2022

(30) Foreign Application Priority Data

Dec. 11, 2019 (EP) .................................... 19215086

(51) Int. Cl.

*B26B 19/14* (2006.01)
*B26B 19/38* (2006.01)

(52) U.S. Cl.

CPC ............ *B26B 19/145* (2013.01); *B26B 19/38* (2013.01)

(58) Field of Classification Search

CPC ....... B26B 19/14; B26B 19/145; B26B 19/38; B26B 19/3853; B26B 19/386

See application file for complete search history.

(56) References Cited

U.S. PATENT DOCUMENTS 2,952,909 A 9/1960 Vaes
3,045,346 A * 7/1962 Akerib .................. B26B 19/042 30/346.51

(Continued)

FOREIGN PATENT DOCUMENTS

CN 201179660 Y 1/2009
CN 101683739 A 3/2010

(Continued)

OTHER PUBLICATIONS

International Search Report and Written Opinion Dated Feb. 23, 2021 For International Application No. PCT/EP2020/084368 Filed Dec. 3, 2020.

*Primary Examiner* — Richard D Crosby, Jr.

(57) ABSTRACT

A hair-cutting unit for use in a hair-cutting appliance comprises includes cutting members a base member, and a supporting member which is pivotable relative to the base member and accommodates the cutting members. The hair-cutting unit further includes a holding member which is pivotable relative to the supporting member between a holding position of holding the cutting members in an operational position in the supporting member, and a releasing position of releasing the cutting members for removal from the supporting member, and a biasing mechanism which is configured to bias the holding member towards the holding position. At least in an opened position of the supporting member, pivoting of the holding member out of the holding position is prevented solely by the biasing force of the biasing mechanism.

20 Claims, 5 Drawing Sheets

(56) References Cited

U.S. PATENT DOCUMENTS

| | | | | |
|---|---|---|---|---|
| 3,399,453 | A | 9/1968 | Louw | |
| 6,354,005 | B1 * | 3/2002 | Bosch | B26B 19/14 30/43.6 |
| 6,722,038 | B2 | 4/2004 | Visman | |
| 8,296,954 | B2 * | 10/2012 | Schneider | B26B 19/14 30/43.6 |
| 8,336,211 | B2 * | 12/2012 | De Wit | B26B 19/14 30/43.6 |
| 8,393,082 | B2 * | 3/2013 | Shimizu | B26B 19/146 30/527 |
| 9,009,978 | B2 * | 4/2015 | Schneider | B26B 19/14 30/43.6 |
| 9,027,251 | B2 * | 5/2015 | Schmitt | B26B 19/14 30/41 |
| 9,592,614 | B2 * | 3/2017 | Oosterhoff | B26B 19/146 |
| 2,787,053 | A1 * | 5/2020 | Meijer | B26B 19/14 |
| 10,654,182 | B2 * | 5/2020 | Meijer | B26B 19/14 |
| 10,933,545 | B2 * | 3/2021 | Lap | B26B 19/146 |
| 11,186,000 | B2 * | 11/2021 | Lap | B26B 19/3846 |
| 2011/0067243 | A1 * | 3/2011 | Darwinkel | B26B 19/3873 30/42 |
| 2013/0019480 | A1 * | 1/2013 | Schneider | B26B 19/382 30/41.6 |
| 2020/0130206 | A1 * | 4/2020 | Niles | B26B 19/3853 |

FOREIGN PATENT DOCUMENTS

| | | | |
|---|---|---|---|
| CN | 201863224 | U | 6/2011 |
| EP | 2043827 | B1 | 11/2010 |
| WO | 2008/010139 | A1 | 1/2008 |
| WO | 2010/034175 | A1 | 4/2010 |
| WO | 2011/055323 | A1 | 5/2011 |
| WO | 2018138094 | A1 | 8/2018 |

* cited by examiner

Fig. 4
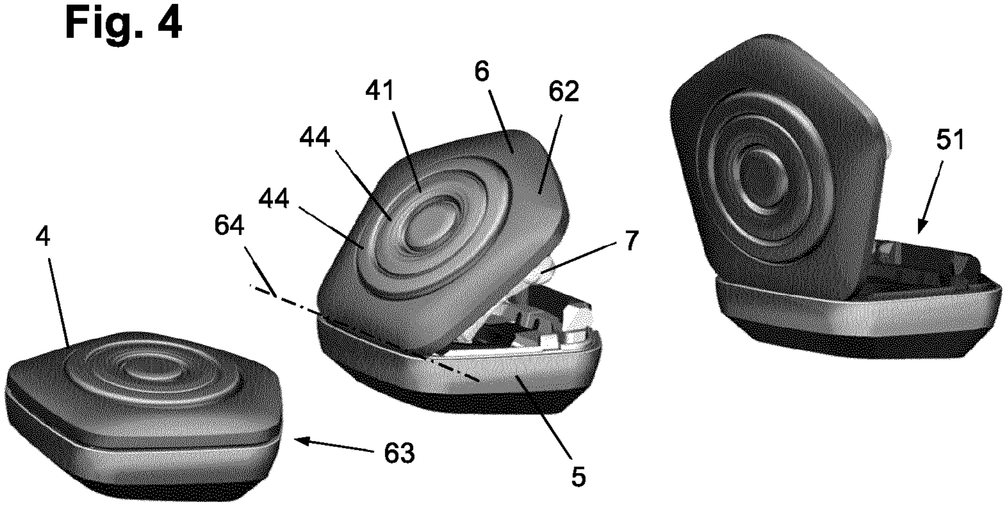
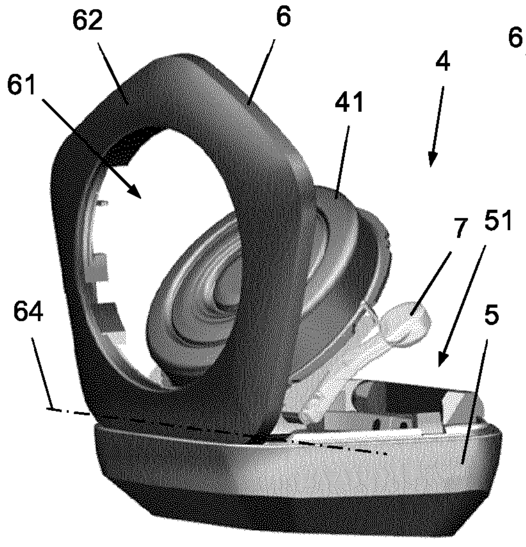
Fig. 5
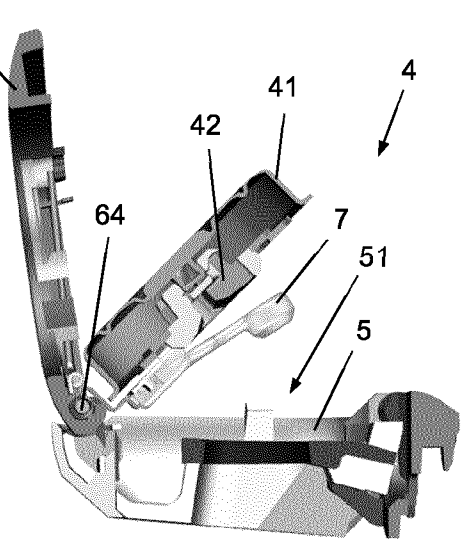
Fig. 6

HAIR-CUTTING UNIT FOR USE IN A HAIR-CUTTING APPLIANCE

CROSS REFERENCE TO RELATED APPLICATIONS

This application is the U.S. National Phase application under 35 U.S.C. § 371 of International Application No. PCT/EP2020/084368 filed Dec. 3, 2020, which claims the benefit of European Patent Application Number 19215086.0 filed Dec. 11, 2019. These applications are hereby incorporated by reference herein.

FIELD OF THE INVENTION

The invention relates to a hair-cutting unit for use in a hair-cutting appliance, comprising an external cutting member having hair-entry openings, an internal cutting member having at least one hair-cutting element and being movable with respect to the external cutting member, a base member having a hair-collecting chamber, a supporting member accommodating the external cutting member and the internal cutting member, wherein the supporting member is pivotable relative to the base member between a closed position in which the hair-collecting chamber is closed and an opened position in which the hair-collecting chamber is open and accessible, and a holding member which is pivotable relative to the supporting member between a holding position in which the holding member is arranged to hold the external cutting member and the internal cutting member in an operational position in the supporting member, and a releasing position in which the holding member is arranged to release the external cutting member and the internal cutting member for removal from the supporting member.

Further, the invention relates to a hair-cutting appliance such as a shaving appliance, comprising at least one hair-cutting unit as mentioned and a drive system for driving the internal cutting member of the at least one hair-cutting unit.

BACKGROUND OF THE INVENTION

The invention is in the field of hair-cutting appliances, particularly hair-cutting appliances which are designed to perform shaving actions and the like in which hairs are cut at a position close to the skin. In general, a hair-cutting appliance comprises a head where one or more hair-cutting units are located. A particularly common design uses three hair-cutting units in an equilateral triangular configuration. Each hair-cutting unit comprises a combination of an internal cutting member and an external cutting member which is arranged to cover the internal cutting member, the external cutting member being provided with a series of hair-entry openings for allowing hairs to reach through the external cutting member and encounter the internal cutting member during a hair-cutting action. In a practical design, the external cutting member is generally cup-shaped and has a substantially circular periphery, wherein the hair-entry openings may be shaped like elongated slits extending substantially radially with respect to a central axis of the external cutting member, in one or more annular areas referred to as cutting tracks. Such an external cutting member is particularly suitable to be used in a hair-cutting appliance of the rotary type, i.e. a hair-cutting appliance including at least one hair-cutting unit in which the internal cutting member is arranged so as to rotate during operation.

The external cutting member has a cutting track surface for contacting the skin at the position of the cutting track(s) during a hair-cutting action. At positions where the hair-entry openings are delimited, cutting surfaces are present in the external cutting member. The internal cutting member includes blades having cutting edges. During a hair-cutting action, hairs entering the hair-entry openings are sheared between the cutting surfaces and the cutting edges, and are cut as a result thereof. Proper use of the hair-cutting appliance involves putting the appliance to an active state, i.e. a state in which the internal cutting member of the at least one hair-cutting unit is moved, and moving the head over a skin area which is to be subjected to a hair-cutting action.

Besides the internal cutting member and the external cutting member, a hair-cutting unit may comprise a base member having a hair-collecting chamber and a supporting member which is designed to accommodate the external cutting member and the internal cutting member, and to also serve as removable seal of the hair-collecting chamber. In respect of the latter aspect of the supporting member, it is practical if the supporting member is pivotable relative to the base member between a closed position in which the hair-collecting chamber is closed and an opened position in which the hair-collecting chamber is open and accessible. According to a practical option, the supporting member has a skin-supporting surface for contacting a portion of skin to be subjected to a hair-cutting action.

For the purpose of holding the external cutting member and the internal cutting member in an operational position in the supporting member, the hair-cutting unit may further comprise a holding member. Advantageously, in order to allow removal of the external cutting member and the internal cutting member from the supporting member when the supporting member is in the opened position, for the purpose of cleaning or replacement for example, such a holding member is not in a fixed position relative to the supporting member. In this respect, it is noted that it is practical if the holding member is pivotable relative to the supporting member between a holding position and a releasing position.

WO 2011/055323 A1 discloses a hair-cutting unit which comprises a cap including both the external cutting member and the supporting member as defined in the foregoing. The known hair-cutting unit further comprises an internal cutting member, a base member, and a holding member which is movable relative to the cap between a holding position in which the holding member is arranged to hold the internal cutting member in an operational position in the cap, and a releasing position in which the holding member is arranged to release the internal cutting member for removal from the cap. To clean or replace the internal cutting member, the holding member is moved with respect to the cap to the releasing position. In particular, the holding member is pivotably coupled to the cap and located between the cap and the base member. Further, the holding member is provided with a locking member which can be locked to the cap.

If a user wants to remove the internal cutting member from the cap, he/she puts the cap to an opened position by pivoting the cap away from the base member. The holding member is locked to the cap by means of the locking member and is in the holding position in which the holding member holds the internal cutting member inside the cap and prevents it from falling out of the cap. The user unlocks the locking member of the holding member from the cap and pivots the holding member away from the cap in order to put the holding member to the releasing position. At that stage, the user can remove the internal cutting member from the hair-cutting unit without being hindered by the holding member. After cleaning or replacing the internal cutting member, the user puts the internal cutting member back inside the cap, and subsequently moves the holding member back to the holding position and locks the holding member to the cap by means of the locking member. Finally, the user closes the cap by pivoting it towards the base member.

The above-described steps needed for removing the internal cutting member from the cap and subsequently putting the same or another internal cutting member in place in the cap requires a considerable level of skill from the user. This is all the more true in practical cases in which the hair-cutting unit is of a rather small size compared to the general size of human hands and in which there is not much space for manipulating the various components involved in the steps.

SUMMARY OF THE INVENTION

It is an object of the invention to provide a hair-cutting unit which is suitable for use in a hair-cutting appliance and which is designed so as to enable an uncomplicated procedure for removing the external cutting member and the internal cutting member from the supporting member and placing the external cutting member and the internal cutting member in the supporting member, which can be put to practice without requiring specific "technical" user skills.

In view of the foregoing, the invention provides a hair-cutting unit for use in a hair-cutting appliance, comprising an external cutting member having hair-entry openings, an internal cutting member having at least one hair-cutting element and being movable with respect to the external cutting member, a base member having a hair-collecting chamber, a supporting member accommodating the external cutting member and the internal cutting member, wherein the supporting member is pivotable relative to the base member between a closed position in which the hair-collecting chamber is closed and an opened position in which the hair-collecting chamber is open and accessible, a holding member which is pivotable relative to the supporting member between a holding position in which the holding member is arranged to hold the external cutting member and the internal cutting member in an operational position in the supporting member, and a releasing position in which the holding member is arranged to release the external cutting member and the internal cutting member for removal from the supporting member, and a biasing mechanism which is configured to exert a biasing force on the holding member for biasing the holding member relative to the supporting member towards the holding position, wherein, at least in the opened position of the supporting member with the holding member in the holding position, pivoting of the holding member relative to the supporting member out of the holding position is prevented solely by the biasing force of the biasing mechanism.

It follows from the foregoing definition that the hair-cutting unit according to the invention is equipped with a biasing mechanism which is designed to bias the holding member relative to the supporting member towards the holding position. This means that when a user intends to successively take out and put back the external cutting member and the internal cutting member and puts the supporting member to the opened position to that end, the holding member is made to automatically follow the supporting member as it is pivoted. In the situation that is obtained in that way, i.e. the situation in which the holding member is in the holding position under the influence of the biasing mechanism while the supporting member is in the opened position, the user can manipulate the holding member according to desire, particularly put the holding member to the releasing position by pressing the holding member away from the supporting member, against the action of the biasing mechanism.

The configuration of the relevant components is chosen such that at least in the opened position of the supporting member with the holding member in the holding position, pivoting of the holding member relative to the supporting member out of the holding position is prevented solely by the biasing force of the biasing mechanism. Contrary to what is known from WO 2011/055323 A1, there is no need for the user to operate something like a locking member acting between the supporting member and the holding member. Instead, the user only has to take into account the advantageous facts that according to the invention, i) the holding member is in the holding position as a default, ii) the holding member can be put to the releasing position just by taking hold of the holding member and moving it against the action of the biasing mechanism, and iii) the holding member is automatically made to pivot to the holding position as soon as the user lets go of the holding member.

It may further be advantageous if also in the closed position of the supporting member with the holding member in the holding position, pivoting of the holding member relative to the supporting member out of the holding position is prevented solely by the biasing force of the biasing mechanism. The fact is that in this way, it is achieved that as a consequence of the biasing mechanism acting on the holding member, a resilient support of the external cutting member and the internal cutting member in the supporting member is obtained, which enables retraction of the cutting members relative to the supporting member under the influence of skin pressure during a hair-cutting action. Thereby, a reduction of pressure peaks on the skin may be realized. Said resilient support provided by the biasing mechanism may be in addition to, or instead of, the resilient support of the external cutting member and the internal cutting member provided in a known way by a drive spindle which drives the internal cutting member. In general, it is practical if the supporting member has a skin-supporting surface for contacting a portion of skin to be subjected to a hair-cutting action.

The invention covers a practical embodiment in which the holding member has a pivotal bearing relative to the base member; and the biasing mechanism is configured to bias the holding member relative to the base member and to exert the biasing force on the holding member in any pivoted position of the supporting member relative to the base member between the closed position and the opened position. On the basis of the fact that the holding member is biased relative to the base member in any pivoted position of the supporting member relative to the base member in this embodiment, it is possible that the biasing force exerted by the biasing mechanism on the holding member is also allowed to act on the supporting member and to move the supporting member from the closed position to the opened position when the supporting member is released from the base member to do so. Hence, in this embodiment, it is possible that the biased holding member has a function in pushing the supporting member to the opened position.

According to a practical possibility, the biasing mechanism comprises a mechanical spring element such as a torsion spring. In order to reduce complexity of design, a configuration is feasible in which the supporting member and the holding member are each individually pivotable relative to the base member about a common pivot axis. In that case, when the biasing mechanism comprises a torsion spring, it is practical if a torsion axis of the torsion spring coincides with the common pivot axis of the supporting member and the holding member. In general, it may be so that the supporting member and the holding member are both mounted to the base member.

Especially when the biasing mechanism is also used to bias the supporting member to the opened position, as suggested earlier, it is advantageous if the hair-cutting unit comprises a locking mechanism arranged to lock the supporting member to the base member in a releasable fashion when the supporting member is in the closed position. For example, the supporting member and the base member, respectively, may be provided with snap connection elements which are arranged and configured to automatically engage each other when the supporting member is moved from the opened position into the closed position. The holding member may be of any appropriate design. In a practical embodiment included in the invention, the holding member has a generally U-shaped portion, wherein the holding member is pivotably mounted to the base member at the position of a base of the generally U-shaped portion. In such an embodiment, the legs of the generally U-shaped portion are suitable to function as a kind of levers for the user to press on. To that end, it is advantageous if each of the two legs includes an enlarged end section. According to another or additional option, the holding member may have a ring-shaped portion which is suitable for supporting the internal cutting member and preventing the internal cutting member from falling out of the hair-cutting unit too easily when the supporting member is put to the opened position and the hair-cutting unit is subjected to forces following from shaking or falling.

In a practical embodiment of the hair-cutting unit according to the invention, the holding member is provided as part of an entirety which further includes a first mounting member which is mounted to the supporting member and a second mounting member which is mounted to the base member. Another option relating to the holding member is an option of the holding member being provided with at least one retention element which is configured to engage with the external cutting member, for preventing movement of the external cutting member in a direction in which the internal cutting member moves during operation.

The above-described and other aspects of the invention will be apparent from and elucidated with reference to the following detailed description of practical embodiments of a hair-cutting unit for use in a hair-cutting appliance.

BRIEF DESCRIPTION OF THE DRAWINGS

The invention will now be explained in greater detail with reference to the figures, in which equal or similar parts are indicated by the same reference signs, and in which:

FIG. 4 illustrates a process of a supporting member which is also part of a hair-cutting unit of the hair-cutting appliance shown in FIG. 1, moving from a closed position to an opened position;

FIG. 5 diagrammatically shows a perspective view of a hair-cutting unit of the hair-cutting appliance shown in FIG. 1 with the supporting member in the opened position and a holding member which is also part of the hair-cutting unit in a releasing position for releasing the external cutting member and the internal cutting member for removal from the supporting member;

FIG. 6 diagrammatically shows a sectional side view of the hair-cutting unit shown in FIG. 5 with the supporting member in the opened position and the holding member in the releasing position;

DETAILED DESCRIPTION OF EMBODIMENTS

Figure 1:
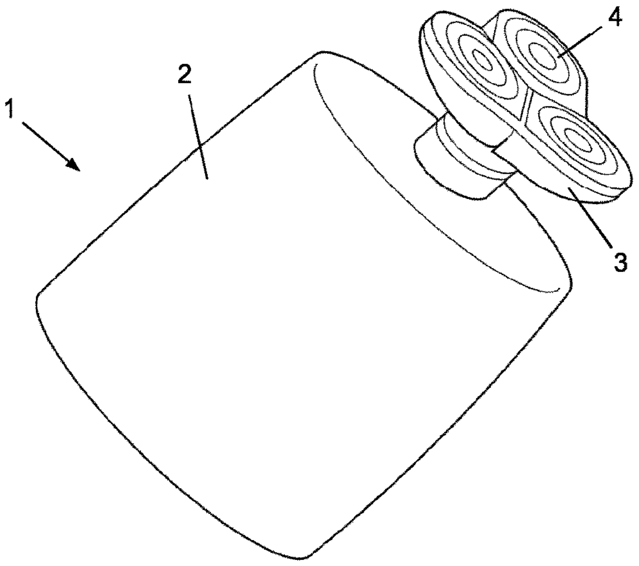
FIG. 1 diagrammatically shows a perspective view of a hair-cutting appliance according to the invention including a head in which three hair-cutting units according to the invention are located.

FIG. 1 shows a shaving appliance of the rotary type as a practical example of a hair-cutting appliance 1 according to the invention. The hair-cutting appliance 1 comprises a body 2 which is intended to be taken hold of by a user of the hair-cutting appliance 1, and a head 3 which is intended to be pressed against a skin area to be subjected to a hair-cutting action. The body 2 of the hair-cutting appliance 1 is also commonly referred to as handle. For various reasons such as a need to service and/or clean the head 3, a need to replace the head 3 by a head of another type, etc., it is practical if the head 3 is removably or hingably mounted to the body 2. The head 3 includes a number of hair-cutting units 4 according to the invention, the number being three in the shown example. When the hair-cutting appliance 1 is applied for the purpose of subjecting a skin area to a hair-cutting action, the actual process of cutting off hairs protruding from the skin area takes place at the position of the hair-cutting units 4.

Figure 2:
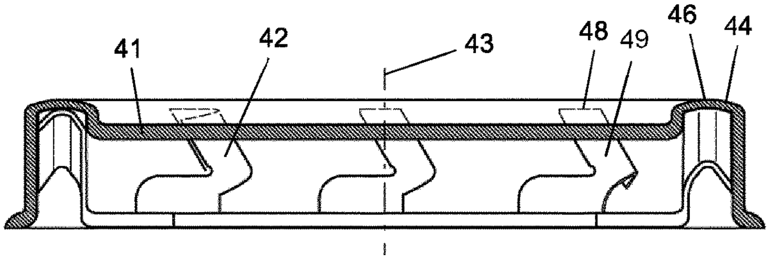
FIG. 2 diagrammatically shows a sectional view of a combination of an external cutting member and an internal cutting member, which combination is part of a hair-cutting unit of the hair-cutting appliance shown in FIG. 1.
Figure 3:
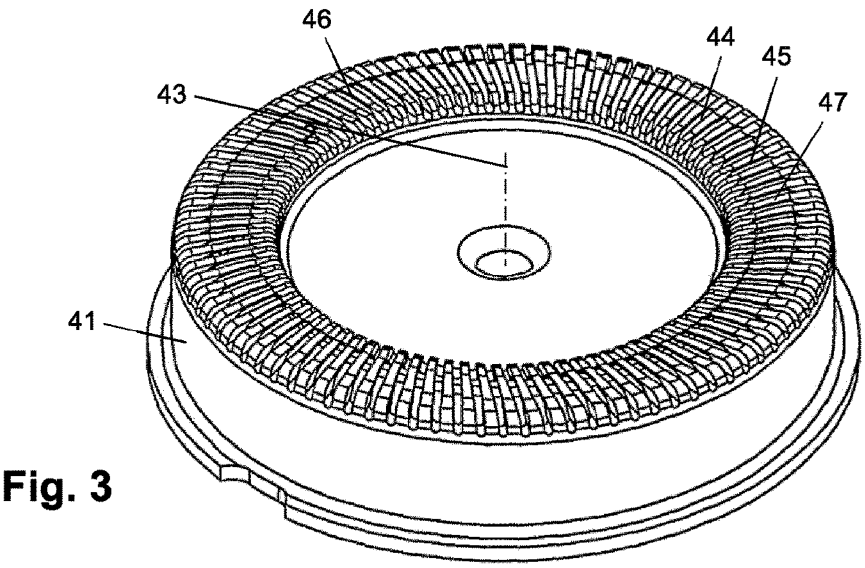
FIG. 3 diagrammatically shows a perspective view of an example of the external cutting member of the combination shown in FIG. 2.

With reference to FIGS. 2 and 3, the basic hair-cutting functionality of a hair-cutting unit 4 will now be described in more detail. The hair-cutting unit 4 comprises an external cutting member 41 and an internal cutting member 42. The external cutting member 41 is of a generally cup-shaped design, having a substantially circular periphery and a central axis 43, whereby the external cutting member 41 is suitable for at least partially accommodating the internal cutting member 42 in its interior. In the base of the cup-shaped design of the external cutting member 41, at least one annular cutting track 44 is present, which comprises lamellae 45 extending along the width of the cutting track 44, in a substantially radial direction relative to the central axis 43 of the external cutting member 41. In the example shown in FIG. 3, an external cutting member 41 having a single cutting track 44 is illustrated, whereas in FIGS. 4, 5 and 6, an external cutting member 41 having more than one cutting track 44, namely two cutting tracks 44, is illustrated.

At the position of the cutting track 44, the external cutting member 41 has a cutting track surface 46 for contacting the skin of the user during a hair-cutting action. Apertures as present between the lamellae 45 constitute hair-entry openings 47 in the cutting track surface 46. Sides of the lamellae 45 constitute cutting surfaces suitable for cutting off hairs in cooperation with hair-cutting edges 48 of hair-cutting elements 49 of the internal cutting member 42. A hair-cutting action can be performed when the internal cutting member 42 of the hair-cutting unit 4 is activated to rotate and a skin area is actually contacted by the external cutting member 41 at the position of the cutting track 44. Activation of the internal cutting member 42 may take place in a known manner by means of a drive system of the hair-cutting appliance 1, which is not shown in the figures. When the hair-cutting unit 4 is moved over the skin area, it is achieved that hairs protruding from the skin area are caught in the hair-entry openings 47 of the external cutting member 41 and are cut off in that position as result of a cooperation between the cutting surfaces as present at the sides of the lamellae 45 delimiting the hair-entry openings 47 and the hair-cutting edges 48 of the rotating internal cutting member 42.

With reference to FIGS. 4, 5 and 6, it is noted that besides the external cutting member 41 and the internal cutting member 42, the hair-cutting unit 4 comprises a base member 5, a supporting member 6 and a holding member 7. The base member 5 has a hair-collecting chamber 51 for receiving and accommodating hairs which are cut off during a hair-cutting action. The supporting member 6 has an opening 61 in which the external cutting member 41 and the internal cutting member 42 covered by the external cutting member 41 are accommodated and serves for sealing the hair-collecting chamber 51 in an operational, normal condition of the hair-cutting unit 4. The supporting member 6 further has a skin-supporting surface 62 for contacting a portion of skin to be subjected to a hair-cutting action, which skin-supporting surface 62 is arranged so as to surround the external cutting member 41.

In view of the fact that it is practical if access to the hair-collecting chamber 51 can be allowed from time to time, for the purpose of emptying the hair-collecting chamber 51 for example, the supporting member 6 is arranged so as to be pivotable with respect to the base member 5 between a closed position in which the hair-collecting chamber 51 is closed, and an opened position in which the hair-collecting chamber 51 is open and accessible for cleaning. In this respect, it is noted that a process of the supporting member 6 moving from the closed position to the opened position is illustrated in FIG. 4. For the purpose of securing the closed position of the supporting member 6, the hair-cutting unit 4 is equipped with a suitable locking mechanism 63 such as a mechanism which is designed to realize a releasable snap connection.

The holding member 7 is pivotably arranged in the hair-cutting unit 4 at a position between the base member 5 and the supporting member 6, wherein the holding member 7 is pivotable relative to the base member 5 on the one hand and pivotable relative to the supporting member 6 on the other hand as well. FIG. 6 illustrates the fact that the supporting member 6 and the holding member 7 can be arranged so as to be individually and independently pivotable relative to the base member 5 about a common pivot axis 64. The holding member 7 serves to hold the external cutting member 41 and the internal cutting member 42 in an operational position in the supporting member 6, i.e. a position in which the external cutting member 41 and the internal cutting member 42 covered by the external cutting member 41 are in place in the opening 61 of the supporting member 6. The pivotable arrangement of the holding member 7 allows for movement of the holding member 7 between a holding position in which the holding member 7 holds the external cutting member 41 and the internal cutting member 42 in the operational position in the supporting member 6 as mentioned, and a releasing position in which the holding member 7 is at a position for leaving space for the external cutting member 41 and the internal cutting member 42 to be removed from the supporting member 6.

The hair-cutting unit 4 further comprises a biasing mechanism 8 which serves to exert a biasing force on the holding member 7 for biasing the holding member 7 relative to the supporting member 6 towards the holding position. The combination of the opened position of the supporting member 6 and the releasing position of the holding member 7 is shown in FIGS. 5 and 6, wherein the external cutting member 41 and the internal cutting member 42 are shown in a position in which the external cutting member 41 and the internal cutting member 42 can be readily removed from the hair-cutting unit 4. At least in the opened position of the supporting member 6 with the holding member 7 in the holding position, pivoting of the holding member 7 relative to the supporting member 6 out of the holding position is prevented solely by the biasing force exerted by the biasing mechanism 8. Hence, there is no need for measures aimed at locking the holding member 7 to the supporting member 6 in the holding position of the holding member 7, which might otherwise require providing some kind of releasable coupling between the holding member 7 and the supporting member 6, for example.

On the basis of the functionality of the biasing mechanism 8, the external cutting member 41 and the internal cutting member 42 are prevented from falling out of the supporting member 6 in an uncontrolled manner when the supporting member 6 is in the opened position. The holding position of the holding member 7 is maintained and consequently, the external cutting member 41 and the internal cutting member 42 are kept in place in the supporting member 6 by the biasing force of the biasing mechanism 8, until the user acts to move the holding member 7 to the releasing position. Moving the holding member 7 from the holding position to the releasing position includes steps of taking hold of the holding member 7 and pivoting the holding member 7 away from the supporting member 6 and towards the base member 5, against the action of the biasing mechanism 8. These steps can simply be done by the user, for example using only a single finger. As soon as the user lets go of the holding member 7, the holding member 7 is moved back towards the holding position under the influence of the biasing mechanism 8. Also when the user desires to put the external cutting member 41 and the internal cutting member 42 in place in the supporting member 6, he/she acts to temporarily retain the holding member 7 in the releasing position and to let go of the holding member 7 as soon as the holding functionality of the holding member 7 is needed. Under all circumstances, it comes in handy that the holding member 7 is urged to move towards the holding position as a default position.

Figure 7:
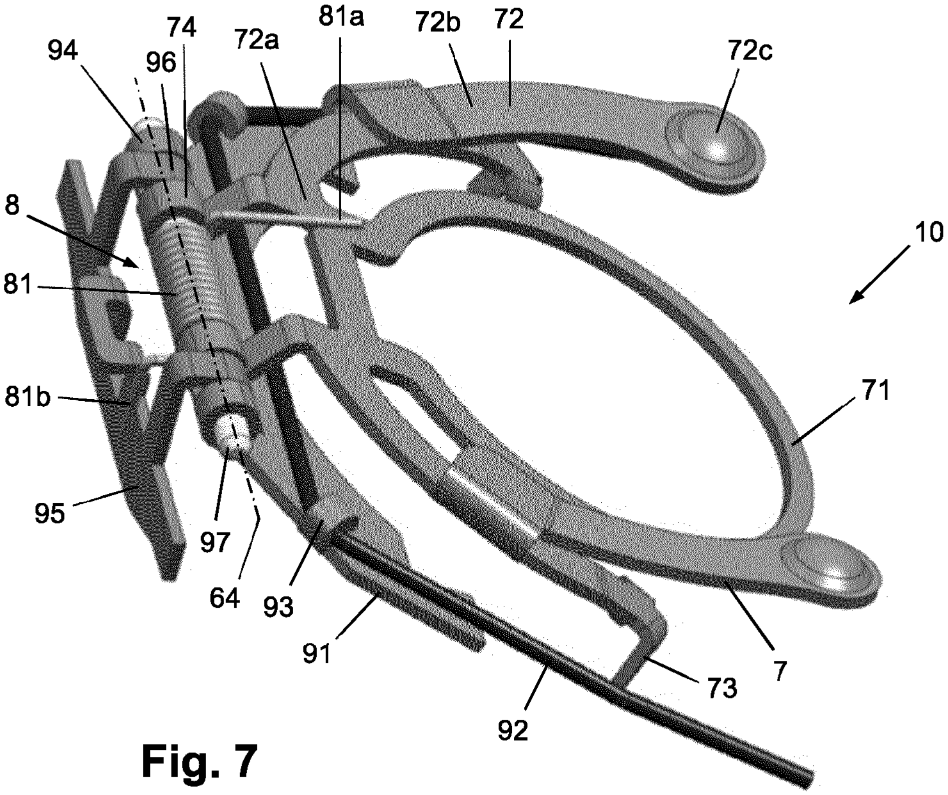
FIG. 7 diagrammatically shows a perspective view of an entirety of the hair-cutting unit shown in FIG. 5 comprising, among other things, the holding member and a biasing mechanism including a torsion spring acting on the holding member.
Figure 12:
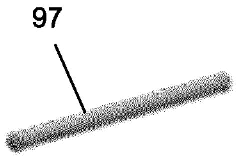
Figure 13:
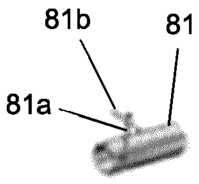
Figure 14:
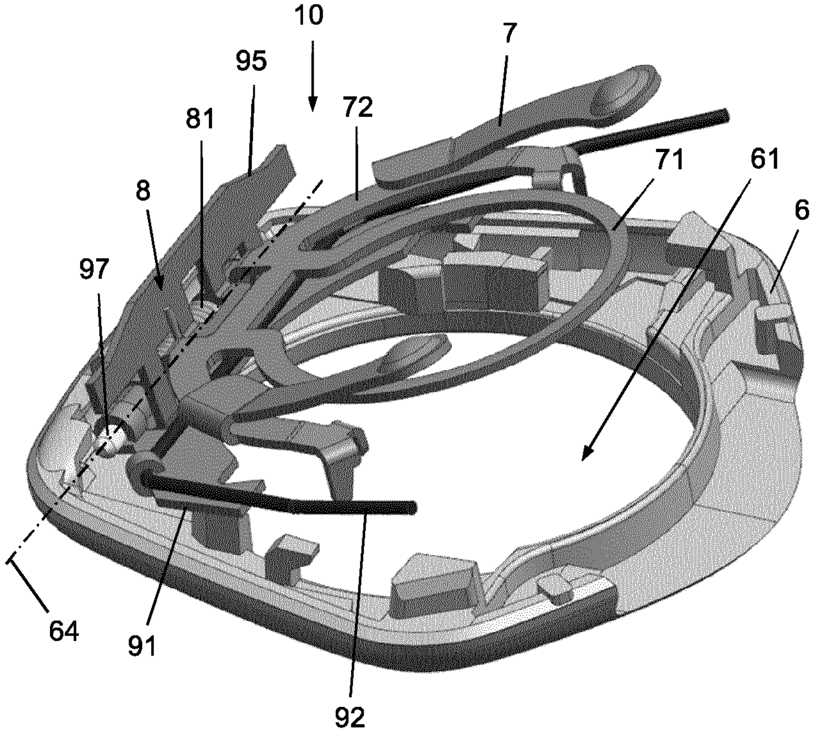
FIG. 14 diagrammatically shows an assembly of the entirety shown in FIG. 7 and the supporting member, at a stage prior to final mounting of the entirety on the supporting member.

FIG. 7 shows an entirety 10 comprising the holding member 7, the biasing mechanism 8 and a number of other components as will be elucidated in the following, wherein it is noted that FIGS. 8, 9, 10, 11, 12 and 13 provide separate views of the various components of the entirety 10, and that FIG. 14 provides a view of an assembly of the entirety 10 and the supporting member 6, at a stage prior to final mounting of the entirety 10 on the supporting member 6.

Figure 8:
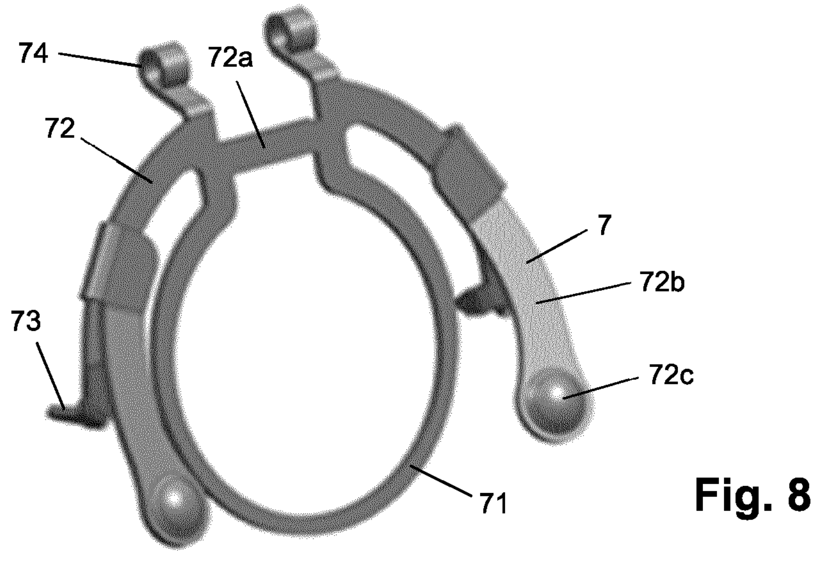
FIGS. 8, 9, 10, 11, 12 and 13 diagrammatically show perspective views of various components of the entirety shown in FIG. 7.

The holding member 7 is separately shown in FIG. 8. In the present example, the holding member 7 includes a ring-shaped portion 71 and a generally U-shaped portion 72 having a base 72*a* and two legs 72*b*. The holding member 7 is designed to support the external cutting member 41 and the internal cutting member 42 in the supporting member 6, wherein the ring-shaped portion 71 especially functions to prevent the external cutting member 41 and the internal cutting member 42 from immediately falling out of the supporting member 6 when the supporting member 6 is in the opened position and the holding member 7 is in the releasing position. The generally U-shaped portion 72 has engaging ends 73 for engaging with a peripheral rim of the external cutting member 41, wherein the engaging ends 73 are arranged to prevent movement, in particular rotation of the external cutting member 41 in the direction in which the internal cutting member 42 moves, in particular rotates during operation, and also to define the operational position of the external cutting member 41 in the supporting member 6 in the direction as mentioned. Further, each of the legs 72*b* of the U-shaped portion 72 include an enlarged end section 72*c* for enabling the user to easily take hold of the holding member 7. At the base 72*a* of the U-shaped portion 72, the holding member 7 is provided with a pair of eyes 74 for pivotal attachment of the holding member 7 to the base member 5.

Figure 9:
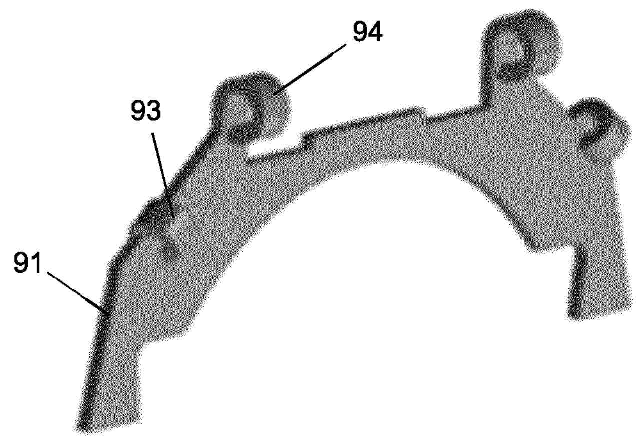
Figure 10:
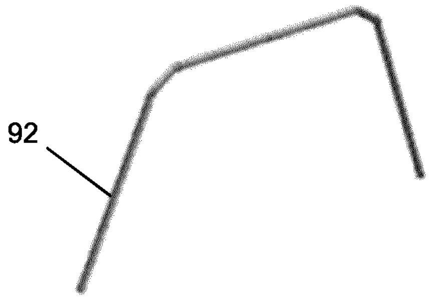
Figure 11:
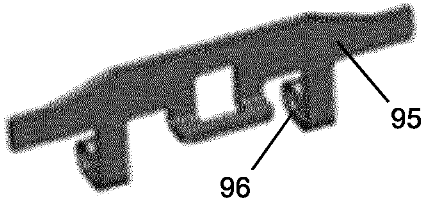

For attachment of the entirety 10 to the supporting member 6, the entirety 10 comprises a mounting plate 91 as separately shown in FIG. 9 and a lock spring 92 as separately shown in FIG. 10. In the shown example, the lock spring 92 comprises a generally U-shaped rod body, and the mounting plate 91 is provided with loop-shaped projections 93 for holding the lock spring 92 on the mounting plate 91. Like the holding member 7, the mounting plate 91 is also provided with a pair of eyes 94 for pivotal attachment of the mounting plate 91. Further, for attachment of the entirety 10 to the base member 5, the entirety 10 comprises a mounting frame 95 as separately shown in FIG. 11, which is provided with a pair of eyes 96 as well. In the assembled condition of the entirety 10 as shown in FIG. 7, the eyes 74 of the holding member 7, the eyes 94 of the mounting plate 91 and the eyes 96 of the mounting frame 95 are aligned, and an axle 97 as separately shown in FIG. 12 is at a position at which it extends through the respective eyes 74, 94, 96, thereby joining the holding member 7, the mounting plate 91 and the mounting frame 95, in such a way that the holding member 7, the mounting plate 91 and the mounting frame 95 are pivotable relative to each other.

In the shown example, for the purpose of exerting a biasing force on the holding member 7 relative to the mounting frame 95, the biasing mechanism 8 comprises a torsion spring 81 as separately shown in FIG. 13 having two legs 81*a*, 81*b*, wherein, in the assembled condition of the entirety 10, the torsion spring 81 is arranged around the axle 97 so that the torsion axis of the torsion spring 81 coincides with the pivot axis 64, and one leg 81*a* abuts against the holding member 7 and another leg 81*b* abuts against the mounting frame 95.

In FIG. 14, it is illustrated how the mounting plate 91 of the entirety 10 is attached to the supporting member 6. The mounting plate 91 is pushed down on the supporting member 6 until the mounting plate 91 and the lock spring 92 held on the mounting plate 91 snap in place on areas of the supporting member 6 which are especially designed to snugly receive portions of the mounting plate 91 and the lock spring 92. In the process, the lock spring 92 is received in the supporting member 6 in a squeezed fashion so as to resiliently abut areas of the supporting member 6 and to thereby reinforce the attachment of the mounting plate 91 to the supporting member 6.

Independent of the exact details of embodiments, by using a biasing mechanism 8 as described in the foregoing in a hair-cutting unit 4, it is achieved that the holding member 7 has a tendency to always follow movement of the supporting member 6 and to always be in the holding position under the influence of the biasing force of the biasing mechanism 8, unless the user interacts with the holding member 7 so as to change the position of the holding member 7 relative to the supporting member 6. In this way, reliability of the hair-cutting unit 4 and the user's level of feeling confident while handling the hair-cutting unit 4 are increased, while a process like replacing the external cutting member 41 and the internal cutting member 42 can be performed in a manner which does not require a high level of technical skill.

The biasing mechanism 8 as described in the foregoing and the absence of any further locking mechanism to lock the holding member 7 in the holding position relative to the supporting member 6 provide the following additional functionalities, at least in embodiments of the hair-cutting unit 4 according to the invention, as will be apparent to the skilled person based on the foregoing description of the hair-cutting unit 4.

Like in the opened position of the supporting member 6, also in the closed position of the supporting member 6, the holding member 7 will be biased into the holding position by the biasing mechanism 8 without being locked into the holding position by any further locking mechanism. Consequently, external pressure forces exerted by the skin on the external cutting member 41 during use, with the supporting member 6 in the closed position, will result in displacements of the external cutting member 41 relative to the supporting member 6 against the biasing force of the biasing mechanism 8. Such displacements will result in an increased contact of the skin with the surrounding skin-supporting surface 62 of the supporting member 6 and, thereby, will reduce pressure peaks on the skin. An additional biasing force might be exerted on the internal cutting member 42, in a known manner, by a drive spindle (not shown in the figures) which rotates the internal cutting member 42. In any case, the above-mentioned displacements of the external cutting member 41 under the influence of external pressure forces are allowed by the biasing mechanism 8 as described in the foregoing.

Furthermore, it will be apparent to the skilled person that the biasing mechanism 8 exerts the biasing force on the holding member 7 in any pivoted position of the supporting member 6 relative to the base member 5 between the closed position and the opened position of the supporting member 6. As a result, when the user unlocks the locking mechanism 63 in the closed position of the supporting member 6, the supporting member 6 will be automatically biased into the opened position by the biasing force of the biasing mechanism 8 exerted on it via the holding member 7. During this automatic motion of the supporting member 6, the holding member 7 will stay in the holding position relative to the supporting member 6 also under the influence of the biasing force of the biasing mechanism 8, so that the external cutting member 41 and the internal cutting member 42 will not fall out of the supporting member 6 during pivoting of the supporting member 6 from the closed to the opened position.

It will be clear to a person skilled in the art that the scope of the invention is not limited to the examples discussed in the foregoing, but that several amendments and modifications thereof are possible without deviating from the scope of the invention as defined in the attached claims. It is intended that the invention be construed as including all such amendments and modifications insofar they come within the scope of the claims or the equivalents thereof. While the invention has been illustrated and described in detail in the figures and the description, such illustration and description are to be considered illustrative or exemplary only, and not restrictive. The invention is not limited to the disclosed embodiments. The drawings are schematic, wherein details which are not required for understanding the invention may have been omitted, and not necessarily to scale.

Variations to the disclosed embodiments can be understood and effected by a person skilled in the art in practicing the claimed invention, from a study of the figures, the description and the attached claims. In the claims, the word “comprising” does not exclude other steps or elements, and the indefinite article “a” or “an” does not exclude a plurality. Any reference signs in the claims should not be construed as limiting the scope of the invention.

Elements and aspects discussed for or in relation with a particular embodiment may be suitably combined with elements and aspects of other embodiments, unless explicitly stated otherwise. Thus, the mere fact that certain measures are recited in mutually different dependent claims does not indicate that a combination of these measures cannot be used to advantage.

The terms “comprise” and “include” as used in this text will be understood by a person skilled in the art as covering the term “consist of”. Hence, the term “comprise” or “include” may in respect of an embodiment mean “consist of”, but may in another embodiment mean “contain/have/be equipped with at least the defined species and optionally one or more other species”.

In the context of the present text, an indication of a component being a member is not to be understood so as to imply that the component is a single, integral entirety. Hence, the indication of a component being a member cover both an option of the component being a single, integral entirety and an option of the component comprising two or more separate pieces which may or may not be joined in some way.

A summary of the invention reads as follows. A hair-cutting unit 4 for use in a hair-cutting appliance 1 comprises an external cutting member 41, an internal cutting member 42, a base member 5 having a hair-collecting chamber 51, and a supporting member 6 accommodating the external cutting member 41 and the internal cutting member 42, wherein the supporting member 6 is pivotable relative to the base member 5 between a closed position and an opened position. The hair-cutting unit 4 further comprises a holding member 7 which is pivotable relative to the supporting member 6 between a holding position of holding the external cutting member 41 and the internal cutting member 42 in an operational position in the supporting member 6, and a releasing position of releasing the external cutting member 41 and the internal cutting member 42 for removal from the supporting member 6, and a biasing mechanism 8 which is configured to bias the holding member 7 towards the holding position. At least in the opened position of the supporting member 6, pivoting of the holding member 7 out of the holding position is prevented solely by the biasing force of the biasing mechanism 8.

The invention claimed is:

1. A hair-cutting unit for use in a hair-cutting appliance, comprising:

an external cutting member having hair-entry openings, an internal cutting member having at least one hair-cutting element and being movable with respect to the external cutting member, a base member having a hair-collecting chamber, a supporting member accommodating the external cutting member and the internal cutting member, wherein the supporting member is pivotable relative to the base member between a closed position in which the hair-collecting chamber is closed and an opened position in which the hair-collecting chamber is open and accessible, a holding member which is pivotable relative to the supporting member between a holding position in which the holding member is arranged to hold the external cutting member and the internal cutting member in an operational position in the supporting member, and a releasing position in which the holding member is arranged to release the external cutting member and the internal cutting member from the operational position for removal from the supporting member, and a biasing mechanism which is configured to exert a biasing force on the holding member for biasing the holding member toward the supporting member for maintaining the holding position, wherein, at least in the opened position of the supporting member with the holding member in the holding position, pivoting of the holding member relative to the supporting member out of the holding position is prevented solely by the biasing force of the biasing mechanism.

2. The hair-cutting unit according to claim 1, wherein, in the closed position of the supporting member with the holding member in the holding position, pivoting of the holding member relative to the supporting member out of the holding position is prevented solely by the biasing force of the biasing mechanism.

3. The hair-cutting unit according to claim 1, wherein:

the holding member has a pivotal bearing relative to the base member; and the biasing mechanism is configured to bias the holding member relative to the base member and to exert the biasing force on the holding member in any pivoted position of the supporting member relative to the base member between the closed position and the opened position.

4. The hair-cutting unit according to claim 1, wherein the biasing mechanism comprises a mechanical spring element.

5. The hair-cutting unit according to claim 4, wherein the mechanical spring element is a torsion spring.

6. The hair-cutting unit according to claim 1, wherein the supporting member and the holding member are each individually pivotable relative to the base member about a common pivot axis.

7. The hair-cutting unit according to claim 6, wherein the biasing mechanism comprises a torsion spring, wherein a torsion axis of the torsion spring coincides with the common pivot axis of the supporting member and the holding member.

8. The hair-cutting unit according to claim 1, wherein the hair-cutting unit comprises a locking mechanism arranged to lock the supporting member to the base member in a releasable fashion when the supporting member is in the closed position.

9. The hair-cutting unit according to claim 1, wherein the holding member has a generally U-shaped portion, and wherein the holding member is pivotably mounted to the base member at a position of a base of the generally U-shaped portion.

10. The hair-cutting unit according to claim 9, wherein the generally U-shaped portion comprises two legs each including an enlarged end section.

11. The hair-cutting unit according to claim 1, wherein the holding member has a ring-shaped portion.

12. The hair-cutting unit according to claim 1, wherein the holding member is included in an assembly which further includes a first mounting member which is mounted to the supporting member and a second mounting member which is mounted to the base member.

13. The hair-cutting unit according to claim 1, wherein the supporting member has a skin-supporting surface for contacting a portion of skin to be subjected to a hair-cutting action.

14. The hair-cutting unit according to claim 1, wherein the holding member is provided with at least one retention element which is configured to engage with the external cutting member, for preventing movement of the external cutting member in a direction in which the internal cutting member moves during operation.

15. A hair-cutting appliance, comprising at least one hair-cutting unit according to claim 1 and a drive system for driving the internal cutting member of the at least one hair-cutting unit.

16. The hair-cutting unit according to claim 1, wherein the holding member comprises a base and two legs extending from the base, and wherein the base of the holding member is pivotably mounted to the base member.

17. A hair-cutting unit comprising:

an external cutting member having hair-entry openings;

an internal cutting member having at least one hair-cutting element and arranged in an interior of the external cutting member;

a base member having a hair-collecting chamber;

a supporting member defining opening for accommodating the external cutting member and the internal cutting member, wherein the supporting member is pivotable relative to the base member between a closed position in which the hair-collecting chamber is closed and an opened position in which the hair-collecting chamber is open and accessible;

a holding member configured to pivot between a holding position and a releasing position, wherein in the holding position, the holding member holds the external cutting member and the internal cutting member in the opening of the supporting member to enable hair cutting action, and in the releasing position, the holding member releases the external cutting member and the internal cutting member from the opening in the supporting member to enable removal of the external cutting member and the internal cutting member; and a spring configured to exert a biasing force on the holding member for biasing the holding member toward the supporting member for maintaining the holding position of the holding member solely by the biasing force of the spring.

18. The hair-cutting unit according to claim 17, wherein the holding member has a pivotal bearing relative to the base member, and wherein the spring is configured to exert the biasing force on the holding member in any pivoted position of the supporting member relative to the base member between the closed position and the opened position.

19. The hair-cutting unit according to claim 17, wherein each of the supporting member and the holding member is individually pivotable relative to the base member about a common pivot axis.

20. The hair-cutting unit according to claim 17, wherein the hair-cutting unit comprises a locking mechanism arranged to lock the supporting member to the base member in a releasable fashion when the supporting member is in the closed position.

* * * * *